United States Patent Office 2,981,681
Patented Apr. 25, 1961

2,981,681

MASS TRANSFER PROCESS

Arthur K. Dunlop, Berkeley, Calif., assignor to Shell Oil Company, a corporation of Delaware No Drawing. Filed Feb. 11, 1958, Ser. No. 714,464

7 Claims. (Cl. 210—24)

This invention relates to a process for transferring components from a liquid mixture to a solid capable of sorbing such components.

It is well known that different types of chemical compounds which occur in liquid mixtures can be separated therefrom by sorption on various known solid sorbents. This characteristic is utilized in many known processes. In one type of sorption process, components present in minor or trace quantities are removed from a liquid by sorption on a suitable solid. In a second type of sorption process, components present in substantial concentration in liquid mixtures are removed by selective sorption on solids.

The contacting of liquids with solids for the purpose of removing components present in low concentration has been carried out either by slurrying the sorbent in the liquid to be treated or by percolating the liquid through a mass of the sorbent particles. In the percolation method, the charge liquid is passed through a stationary body of sorbent until the effectiveness of the sorbent for making a further separation of the components has decreased to an uneconomic level. In processes in which only trace amounts are removed on the sorbent, the used sorbent may be discarded and replaced with fresh material or may be regenerated by more drastic means such as by burning. Where a substantial amount of sorbate is taken out of the charge, thus resulting in a relatively short sorption cycle, the sorbate may be removed from the sorbent mass by any of several known techniques, e.g., by washing with a suitable solvent or by blowing with a gas, such as steam or flue gas, or by a combination of such methods. The sorbent may then be re-used for further treatment of charge material in another cycle of operation.

The above-described percolation procedures utilize the sorbent in the form of a stationary bed of fine particles, e.g., between 20 and 200 mesh. The bed of sorbent mass is filled with liquid throughout the sorption step. In order to obtain the best contact betwen liquid and sorbent, the sorbent is employed in the form of small particles preferably of an assortment of sizes which pack closely so that there are no substantial void spaces between particles in the bed. In order to assure complete contact of all portions of the liquid feed with the sorbent, the rate of passage of the liquid through the bed must be relatively slow to permit diffusion of the sorbable components from the body of the liquid to the sorbent particles. The liquid full column, obstructed by a large closely-meshed mass of solid sorbent, creates a high resistance to flow, thus producing a large pressure drop in the system and necessitating substantial pumping pressure. In processes in which the sorption step is followed by a regeneration in vapor phase it is often difficult to re-establish even flow of the liquid through the contact bed after regeneration. In processes such as the so-called Arosorb process, in which two different liquid phases are required to follow each other through the column in plug flow, it is extremely difficult to maintain a clean separation between the successive liquid phases. The interfaces tend to intermix, resulting in the necessity of discarding large intermediate cuts of mixed composition.

It is an object of this invention to overcome the disadvantages of the percolation method of liquid phase sorption by providing an improved method for mass transfer from liquids to solids. It is a further object to provide an improved process for removing sorbable impurities, present in low concentration, from liquid mixtures. It is a further object to provide an improved process for removing sorbable components, present in substantial concentration, from liquid mixtures. It is a further object of this invention to provide an improved cyclic sorptive separation process.

Briefly, the process of this invention comprises substantially continuously passing a liquid mixture containing a sorbable component downwardly through a bed of stationary particles of a solid sorbent capable of sorbing said component, at the same time passing downwardly through said bed a stream of vapor or gas in sufficient amount to maintain vapor in the interstitial spaces between sorbent particles and forcing the liquid to flow as a thin film over said particles, and recovering as effluent from the sorbent mass liquid substantially denuded of the sorbable component and gas which is suitably recycled for further use.

By carrying out the sorption in the above-described manner, in which the liquid passes down through the sorbent bed in the form of a film on the surface of the particles, numerous advantages are obtained. The rate of passage of the liquid feed through the sorbent mass can usually be substantially increased over that required with a liquid full bed while still obtaining an equal amount of mass transfer. The resistance to flow is much less in the system of this invention so that lower liquid pumping pressures are required.

In cyclic processes in which a regenerating liquid is passed through a column following a feed liquid, contamination of one liquid by the other is greatly decreased because the liquid holdup in the system of this invention is very low. The contamination of liquid feed by regenerating liquid in a cyclic process can be completely avoided by removing any remaining liquid from the sorbent bed, prior to the succeeding step in the cycle, by passing further inert gas through the column for a brief period. There may be in some cases a tendency for liquid to channel along the walls of the vessel. This can be positively prevented by providing at vertically-spaced intervals a collecting tray with distributing pipes to lead liquid from the wall surface back toward the center of the column.

In a process in which gas is liberated while liquid is in contact with sorbent, the conventional percolation process results in quick loss of utility of the bed, due to gas formation in the liquid-solid mass. In the present process, the bed life is equally long, whether or not there is gas liberated.

It is a further advantage that the same degree of removal of sorbable material from a liquid is obtained with a shorter residence time, compared to percolation. Hence, the process of this invention is particularly suited to the treatment of materials which would deteriorate during prolonged contact with a particular sorbent.

Any solid which will preferentially sorb one type of component in a particular charge mixture may be used in the process. Preferably a sorbent which has a high sorption capacity and a high degree of selectivity between the components of the charge mixture is employed. Among the commercially available sorbents, silica gel is particularly suitable for selectively adsorbing aromatic hydrocarbons from admixture with other hydrocarbons but can also be employed to separate many other types of organic compounds of relatively high polarity from other organic compounds of lower polarity. Activated carbon is effective for separating hydrocarbons according to chemical type and in some instances will, to some extent, separate hydrocarbons of the same type according to molecular weight. In many cases activated carbon is capable of selectively adsorbing non-polar compounds, such as hydrocarbons, from polar compounds, such as alcohols, ethers, esters, ketones, aldehydes, etc. Certain zeolites characterized by rigid three-dimensional anionic networks with intracrystalline interstitial channels whose narrowest cross secton has an essentially uniform effective diameter are capable of selectively sorbing molecules whose molecular cross section diameter is no larger than the pores of the zeolite. These zeolites are known as molecular sieves. For example, molecular sieves of about five Angstrom pore diameter are capable of selectively sorbing normal hydrocarbons while not sorbing branched and cyclic compounds. Filter clays are suitable for neutralizing the acidity of acid-treated oils and clays of the fuller's earth type for decolorizing lubricating oils. Activated bauxite and activated alumina are suitable for decolorizing oils.

Ion-exchange resins are a well-known series of compounds used in treating liquid mixtures for removal of selected cations or anions. Cation-exchange resins may be, for example, of the phenolic type, produced by reacting phenol, an aldehyde and a sulfonic acid or sulfite, or of the type produced by copolymerizing such compounds as styrene and divinylbenzene and sulfonating the product or similar resins containing weakly acidic grops, such as carboxylic acids. Anion-exchange resins may be of the weak-base resin type produced by amination of resins with ammonia or a primary or secondary amine, or of the strong-base resin type, produced, for example, by aminating a chloromethylated styrene-divinylbenzene copolymer with trimethylamine. Methods of producing these and other ion-exchange resins and specific applications of such resins are well known to the art. A great number of such resins are commercially available under the trade names Amberlite IR, Dowex, Duolite, Zeo-Karb, Wolfatit, Permutit, etc., and technical publications identify the types of resins represented by the several trade names. Ion-exchange resins are applicable in the deionization of solutions, in the treatment of solutions of pharmaceuticals such as alkaloids, nitrites, hexose phosphates, complex alcohols, enzymes, vitamins, hormones, and the like, in the recovery of metals, e.g., from rayon or electroplating waste solutions, in the separation of acidic impurities from solutions, such as the separation of carboxylic acids from aqueous hydrogen peroxide, and in numerous other applications.

The process of this invention is applicable in improving the separations carried out with any of the above types of sorbents and may also be practiced with any other sorbent which exhibits a substantial selectivity between the components of the particular charge mixture to be treated.

The sorbent is preferably employed in the form of irregularly shaped particles or of spherical or cylindrical pellets having an average diameter in the range from 1/64 inch to 1/4 inch or more. It is preferable to have a contact mass of essentially uniform size. A mixture of widely different particle sizes should be avoided in order to prevent close packing of the sorbent particles in the column. If mixtures of sorbent particles of different sizes are to be used it is preferred to arrange them in the contact bed in such a manner that they are classified, e.g., with the largest particles at the bottom of the bed and the smallest particles near the top of the bed. This can be achieved by so-called back-washing of a contact bed.

In the process of this invention the liquid is contacted with the sorbent in the form of a fixed foraminous bed. By a fixed bed is meant a bed in which the particles of the solid are stationary as distinguished from a bed in which the solid is agitated, e.g., by paddles, force of fluid flow, or the like. The bed may, however, be a so-called moving bed, i.e., a bed which is susbtantially fixed but is slowly replaced by the continuous or intermittent addition of increments of fresh sorbent to one end and the withdrawal of a like amount of sorbent from the other end.

The conditions of temperature and pressure employed in the process may vary widely depending on the charge liquid and sorbent being used. These conditions are well known for any of the above-described separations and for many others.

According to this process the liquid mixture is contacted with the sorbent mass in the presence of an inert vapor or gas. Inert gases are those which do not react adversely with the liquid being treated nor with the sorbent at the conditions prevailing in the contact zone. In most processes, nitrogen can suitably be employed as insert gas. In many processes air, hydrogen, $CO_2$ and the like hydrocarbon gases, e.g., methane, ethane and propane, can also be employed. It is within the scope of this invention to process a liquid which contains a fraction that vaporizes at the temperature and pressure maintained in the sorption zone. The vapors liberated then act like other inert gas in the process.

The rate of flow of inert gas or vapor is sufficient to keep the void spaces between particles filled mainly with vapor rather than with liquid. The liquid travels through the column in the form of a thin film around the solid particles whose pores will also generally contain liquid. The film is sufficiently thin so that the rate of diffusion through it permits the sorbable components to reach the particle surface. The average film thickness, calculated on the basis of average nominal particle surface (i.e. the surface of particles of the same average dimensions but no porosity) is suitably in the range from 0.01 or less to 0.1 times the average particle diameter. A preferred range is from 0.02 to 0.06 times the average particle diameter. The actual film may be sufficiently thin so that the particles, when removed from the column, appear dry. The ratio of gas or vapor to liquid is preferably at least ten volumes per volume and is often more advantageously from 100 to as high as 1,000 or more volumes of gas per volume of liquid, measured at standard temperature and pressure.

Depending on the system of sorbent and feed to which the process is applied, the throughput rates and bed size will vary. However, it is generally suitable to operate at liquid rates two to ten times as high as would be applied in the corresponding percolation. Liquid rates are suitably in the range from 0.5 to 20 gallons per minute per square foot bed cross section. These relatively high rates are obtained with contact beds having a high ratio of length to diameter, preferably at least 5:1.

The wide range of applicability of the process of this invention is demonstrated by the following examples which are for illustrative purposes only and not to be considered a limitation of this invention.

EXAMPLE I

The sorbent in this case was a five Angstrom molecular sieve zeolite of the type sold as MS–5A by Linde Company and described as "calcium-exchanged type A zeolite" in papers by Breck et al. and Reed et al., Journal of the American Chemical Society 78, 5963 and 5972 (1956). The liquid feed was a waxy "100-distillate" from a mixture of East Texas and Louisiana crude oils, which had been solvent-extracted to remove constituents of low-viscosity index. A 100-distillate is a fraction which yields a finished oil having a viscosity of 100 SSU at 100° F. The waxy distillate had a pour point of 80° F. The treatment with molecular sieves was for the purpose of removing normal paraffin constituents to lower the pour point of the feed.

To compare the process of this invention with the conventional percolation methods, three runs were carried out in which the feed oil was percolated through particles of the molecular sieve sorbent, using several sizes of sorbent particles. These runs are reported as Nos. 1, 2 and 3 in Table 1. Three runs were carried out according to the process of this invention. These are reported as runs 4, 5 and 6 in Table 1.

*Table 1*

| Run No. | 1 | 2 | 3 | 4 | 5 | 6 |
|---|---|---|---|---|---|---|
| Method | Prior Art | | | Invention | | |
| Sorbent Particle Size | (1) 2 20-170 | (1) 3 14-30 | (1) 3 1/16" | (1) 3 1/16" | (1) 3 1/16" | (1) 3 1/16" |
| Temperature, °C | 300 | 300 | 295-345 | 375-425 | 375-425 | 350-375 |
| Liquid Hourly Space Velocity | 1-2 | 1-2 | 0.4 | 1 | 1 | 1 |
| Gas Rate, c.f./b. | | | | 600 | 1,500 | 600 |
| Pour Point, °F. | | | | | | |
| Feed | 80 | 80 | 80 | 80 | 80 | 80 |
| Dewaxed Oil, percent wt. of Sieve: | | | | | | |
| 5 | 25 | 20 | 25 | 5 | 5 | −10 |
| 15 | 30 | 25 | 40 | 5 | 10 | 0 |
| 20 | 30 | 30 | 40 | | 10 | |
| 25 | 30 | 45 | 45 | | | 15 |
| 27 | | | | | 35 | |
| 30 | 35 | 45 | 50 | 15 | | |
| 32 | | | | 55 | 70 | |
| 35 | 35 | 55 | 65 | | | |
| 37 | | | | 80 | | |
| 40 | 55 | 60 | | | | |
| 45 | 60 | 65 | | | | |

1 Linde MS-5A.
2 Mesh.
3 Pellets.

Comparison of runs 4, 5 and 6 with runs 1, 2 and 3 demonstrates that by carrying out the contact according to this invention the removal of normals was substantially more thorough, as indicated by the lower pour point. The end point of each run, i.e., the separation between that period during which the sorbent was effective and that period during which the sorbent had lost a substantial proportion of its capacity was much better defined in the runs according to this invention.

EXAMPLE II

The sorbent employed in this example was an anion-exchange resin sold commercially by Dow Chemical Company as Dowex 1. This resin is of the quaternary ammonium type.

Two samples of crude aqueous hydrogen peroxide solution, containing 21% hydrogen peroxide, were treated. The solutions had been produced by the oxidation of isopropyl alcohol with molecular oxygen and differed only slightly in carboxylic acid content. In both cases the sorbent was placed in a 16-inch bed of 1 inch diameter. In one case the normal flooded bed mode of operation was used to treat a feed 0.08 N in carboxylic acids while in the other case the feed which was 0.1 N in carboxylic acids was distributed over the resin by a stream of carbon dioxide-air mixture, charged at 550 ft. per hour superficial velocity. The results were as follows: In both cases, acid removal before break-though was essentially quantitative. However, the acid capacity to break-through achieved by utilization of this invention, 158 milliequivalents, was much superior (33% greater) to the 119-milliequivalent capacity obtained by flooded-bed operation.

I claim as my invention:

1. The cyclic process for transferring components from a first liquid mixture to a solid capable of sorbing said components and subsequently removing said components from said solid by contact with a second liquid which comprises passing said first liquid mixture in a substantially continuous stream downwardly through a bed of stationary particles of said solid, also passing downwardly through said bed simultaneously with said liquid a stream of inert fluid in vapor phase in an amount such that the vapor withdrawn from said bed is at least ten volumes per volume of said liquid and recovering as effluent liquid denuded of said transferred components, discontinuing passage of said first mixture before said components appear in substantial concentration in the effluent, then passing said second liquid downwardly through said bed while simultaneously passing through said bed inert fluid in vapor phase, and recovering as effluent said second liquid enriched in the previously-sorbed component, discontinuing flow of said second liquid after the solid has been regenerated and repeating contact of said solid with said first liquid.

2. In the process of claim 1, the step of continuing passing gas into the bed after passage of liquid feed is discontinued and prior to passage of said second liquid through said bed.

3. In the process of claim 1, the step of passing a liquid which does not elute the sorbate into the bed after passage of liquid feed is discontinued and prior to passage of said second liquid through said bed.

4. A process according to claim 1 in which the sorbent particles' diameters are in the range from 1/64 to 1/4 inch.

5. A process according to claim 4 in which the sorbent particles are of essentially uniform size.

6. A process according to claim 1 in which the average liquid film thickness on the sorbent particles is from 0.01 to 0.1 times the average nominal particle diameter.

7. A process for transferring components from a liquid mixture to a solid capable of sorbing said components which comprises passing said mixture in a substantially continuous liquid stream downwardly through a bed of stationary particles of said solid and effecting a transfer of said components to the solid, also passing downwardly through said bed simultaneously with said liquid stream a stream of inert fluid in a vapor phase in an amount such that the vapor withdrawn from said bed is at least ten volumes per volume of said liquid, said vapor substantially filling the interstitial spaces between the sorbent particles, thus forcing the liquid to flow as a thin film over and in direct contact with the solid particles, and recovering as effluent liquid denuded of said transferred components.

References Cited in the file of this patent

Mantell: "Adsorption," Chemical Engineering Series, 2nd ed., pages 299–303, 1951, McGraw-Hill Book Company, N.Y.

Cassidy: "Fundamentals of Chromatography," Technique of Organic Chemistry Series, vol. X, pp. 298–300, 1957, Interscience Publishers Inc., N.Y.

Gas Chromatography, Chemical Engineering News, vol. 34, No. 15, April 9, 1956, pages 1692–1696.